Patented Sept. 17, 1935

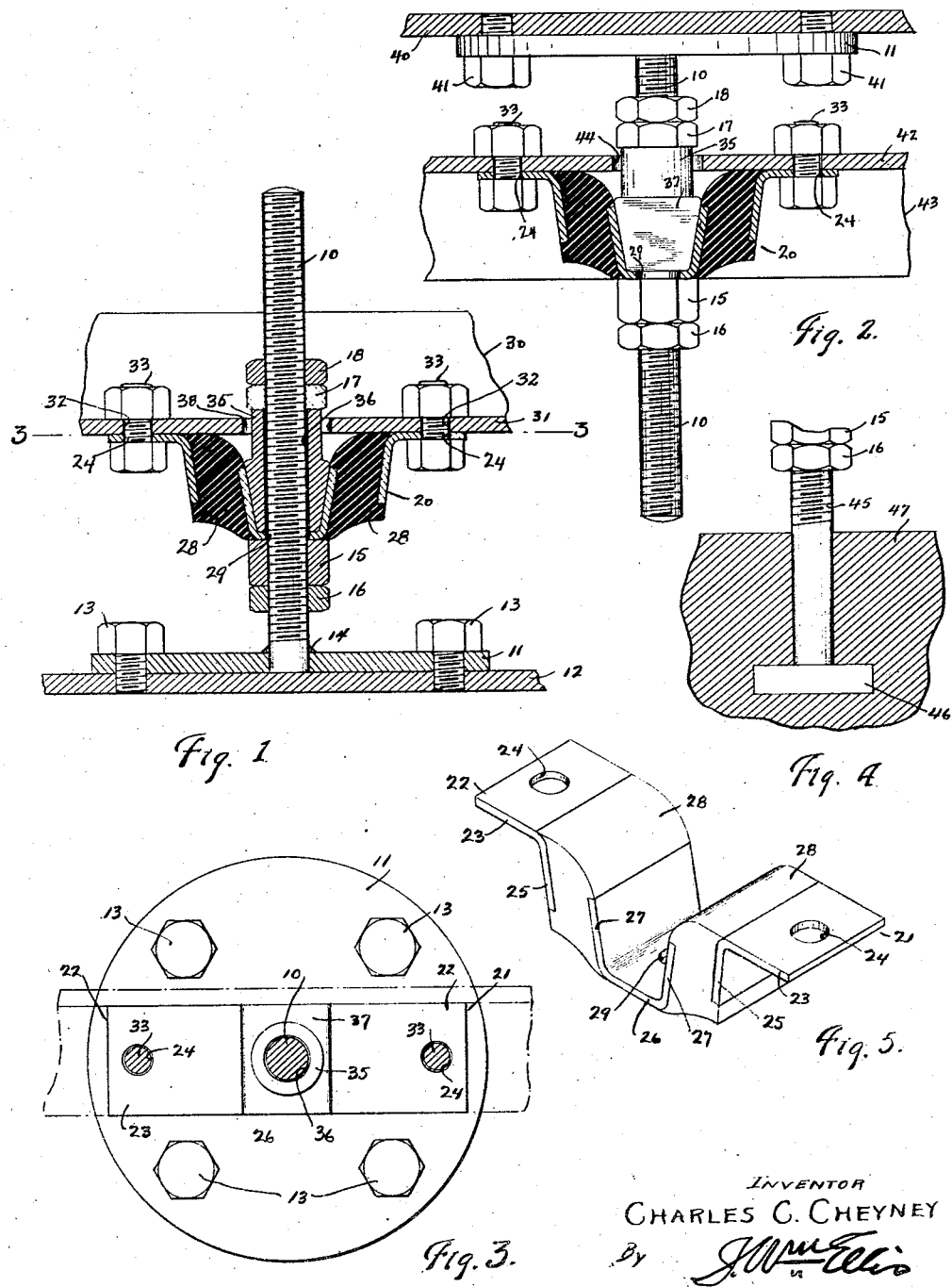

2,014,467

UNITED STATES PATENT OFFICE 2,014,467

CUSHIONING SUPPORTING MEANS

Charles C. Cheyney, Buffalo, N. Y., assignor to Buffalo Forge Company, Buffalo, N. Y., a corporation of New York Application June 16, 1934, Serial No. 730,963

4 Claims. (Cl. 248—22)

It is well-known to those skilled in the art that in various types of machinery installations where the machinery is rigidly fastened to the foundation, there are certain noises and vibrations which, because of such rigid connection, are transferred to the foundation and thence to the connected piece of machinery or the building itself and result in disagreeable noises and/or vibrations.

One of the principal objects of my invention has been to provide a support or foundation bolt which may be fastened to a floor, or a deck of a vessel, or suspended from a ceiling, each of such supports or foundation bolts carrying a cushioning element.

Another object has been to provide a device of this nature which may be easily and conveniently adjusted to any desired position as to height or to level so as to line up and support the machinery to which it is applied.

Other objects are to provide a device of this nature which shall be inexpensive to manufacture and one which shall remain in active service during continuous use.

The above objects and advantages have been accomplished by the device shown in the accompanying drawing, of which:

Fig. 1 is a sectional elevation showing my device supported upon a floor, or the deck of the vessel.

Fig. 2 is a similar view showing my device applied to a ceiling.

Fig. 3 is a sectional plan view taken on line 3—3 of Fig. 1.

Fig. 4 is a fragmentary view showing a support suitable for mounting in cement.

Fig. 5 is a perspective view of one of the cushioning elements.

My device comprises a support 10 in the form of a bolt, which when designed for use upon a floor or a ceiling, as shown in Figs. 1 and 2, respectively, is preferably provided with a metal disk 11. The disk may be secured to the bolt by any suitable means, but preferably by being welded thereto as shown at 14.

As shown in Fig. 1, the metal disk 11 is supported by a floor plate 12, which may be the deck of a vessel or any other substantially horizontal supporting surface. This disk may be secured to the floor by any suitable means such as bolts 13. The bolt 10 is screwthreaded substantially its entire length and it is provided with an adjusting nut 15 and associated lock nut 16 and also with an adjusting nut 17 and lock nut 18.

Mounted upon the bolt 10 is the cushioning element 20 of my device. This element comprises two interspaced flanges 21 and 22 having their legs 23 arranged to lie in substantially the same plane and each of them is provided with an aperture 24, for purposes to be hereinafter described. The other legs 25 of the flanges 21 are arranged at an angle to the legs 23 thereof which is slightly greater than a right angle; and arranged between these legs is a U-shaped member 26. The legs 27 of this U-shaped member are flared outwardly somewhat, and between each pair of legs 27 and legs 25 of the flanges 21 and 22 there is provided an insert of rubber 28. This rubber is secured to the metal surfaces by means of vulcanization or other suitable means whereby it is securely fastened to such surfaces. The U-shaped member is provided with a central aperture 29 for passage over the bolt 10.

In Fig. 1, I have shown in fragmentary manner a flange 30, which is the base flange of any piece of machinery being supported. The leg 31 of the flange is provided with suitable apertures 32 for registration with the apertures 24 of the flanges 21 and 22, and it is secured to the flanges 21 of the cushioning element by means of bolts 33.

When assembling my device, as shown in Fig. 1, the hole 29 of the U-shaped member 26 is passed over the bolt 10 and the U-shaped member is rested upon the nut 15. A sleeve 35 having a centrally-arranged aperture 36 is then passed over the bolt. The sleeve has a tapered, flat-sided portion 37 which passes between the flanges 27 of the U-shaped member and engages the inner surfaces thereof. After this sleeve is in place the nuts 17 and 18 may be placed upon the bolt. The piece of machinery is then put into position, the flange 30 thereof passing over the bolts 10. An aperture 38 is provided in the leg 31 of the flange 30 which is large enough to allow the passage of the upper part of the sleeve 35 and the nuts 17 and 18 so that there may be perfect freedom of movement between the flange 31, which is clamped to the flanges 21 of the cushioning unit, and the elements carried by the bolt 10. The piece of machinery is then lined up or levelled by means of adjustment of the nuts 15 and 16, and 17 and 18. By this means of adjustment, a piece of machinery may be accurately lined up even though the floor which supports the same is not perfectly level, as is the case in the decks of vessels. When the adjusting nuts are tightly screwed down they hold the sleeve 35 and U-shaped member 26 rigidly onto the bolt 10. The flanges 21 and 22 which are secured, as hereinbefore described, to the flange or base plate 30 of the piece of machinery are thus connected to the rigid support through the medium of the resilient material 28 which absorbs vibrations which might be transmitted from the machinery to the floor or vice versa.

When my combined device is to be used to support a piece of machinery from a ceiling or roof, the bolt 10 and its disk 11 are inverted, as shown in Fig. 2. The disk is secured to the ceiling 40 by means of bolts 41, or if the ceiling 40 is the deck of a vessel and is therefore of steel, the disk may be welded thereto if desired. When assembling the device for such support as shown in Fig. 2, the nuts 17 and 18 are first placed upon the bolt and the sleeve 35 is next placed thereon. The cushioning elements 20 having been secured to the leg 42 of the flange or base plate 43 of the piece of machinery to be supported, the elements together with the machinery are elevated to position and the apertures 29 in the U-shaped members 26 of the cushioning elements are passed over the depending bolts 10, whereupon the nuts 15 and 16 are placed upon the bolts, the upper part of the sleeve 35 passing through a large aperture 44 formed in the leg 42 of the base flange 43. The nuts 15 and 16, and 17 and 18 on the bolts 10 are then adjusted so as to properly line up and position the piece of machinery being supported.

When my invention is to be used in a cement foundation, as shown in fragmentary manner in Fig. 4, the foundation bolt 45 is made somewhat longer and is provided at its lower end with an enlarged head 46. A portion of the body of the bolt and the head 46 are then embedded in the cement 47, being of course properly spaced to fit the piece of machinery to be supported thereby. After the bolts have been set in the cement the nuts 15 and 16 are placed thereon and the cushioning elements and piece of machinery being supported are assembled as hereinbefore described in connection with the form of Fig. 1.

From the foregoing, it will be clear that I have provided very simple and effective means for resiliently mounting machinery upon surfaces which may or may not be level, and have provided means for conveniently and accurately adjusting the position of such machinery with respect to the supporting surface.

While I have shown and described a round, screwthreaded foundation bolt as an element of my invention, it should be understood that a rod of other cross-sectional shape may be used in place thereof. The screwthreaded bolt is, however, the preferable form. In the appended claims the term "bolt" is to be construed as also including a rod of the type just referred to. Moreover, while I have shown and described a specific form of cushioning means, it is to be understood that some other form may be advantageously used, and I do not wish to limit my invention only to the form of cushioning means herein illustrated and described. Having thus described my invention, what I claim is:

1. Cushioning means, comprising a foundation bolt, means for anchoring such bolt perpendicularly to the surface carrying the same, a cushioning unit carried by the bolt, such unit having a predetermined resiliency and so designed that it is always under shear distortion when carrying a load and is carried by said bolt, and means carried by the bolt for adjustably positioning the cushioning unit on the bolt whereby when placed on the deck of a boat the cushioning unit may be positioned above the deck and thereby the deck may be flushed without injury to the cushioning unit from the elements of the flushing compound.

2. Cushioning means, comprising a screw-threaded bolt, means for anchoring such bolt perpendicularly to the surface carrying the same, a cushioning unit carried by the bolt, such unit having predetermined resiliency and so designed that it is always under shear distortion when carrying a load, said unit having a centrally arranged U-shaped member, a sleeve having a centrally arranged aperture loosely mounted on the bolt and engageable with the U-shaped member whereby the cushioning element may be tilted at an angle whereby the cushioning means may be leveled up in case the supporting floor or ceiling is not level, and screw-threaded means carried by the bolt and engageable with the cushioning unit for adjustably positioning the cushioning unit on the bolt.

3. Cushioning means, comprising a screw-threaded bolt, means for anchoring such bolt perpendicularly to the surface carrying the same, a cushioning unit which has a predetermined resiliency and is carried by said bolt, such unit comprising a centrally arranged U-shaped member, two flange members, the U-shaped member and the flange members being interspaced and independently mounted, said flange members and said U-shaped member being united by means of interposed resilient material, a sleeve carried by the bolt and engageable with the U-shaped member, and screw-threaded means carried by the bolt and engageable with the U-shaped member and the sleeve for adjustably positioning the cushioning unit on the bolt.

4. Cushioning means, comprising a screw-threaded bolt, means for anchoring such bolt perpendicularly to the surface carrying the same, a cushioning unit which has a predetermined resiliency and is carried by said bolt, such unit comprising a centrally arranged U-shaped member, two flange members, the U-shaped member and the flange members being interspaced and independently mounted, said flange members and said U-shaped member being united by means of interposed resilient material, the U-shaped unit being so positioned that in case the resilient material for any reason gives way the U-shaped unit will still support the machine.

CHARLES C. CHEYNEY.